US009021768B2

(12) United States Patent
Weber

(10) Patent No.: US 9,021,768 B2
(45) Date of Patent: May 5, 2015

(54) APPARATUS FOR CONVEYING OF ARTICLES AND PRODUCT SLICING AND PACKAGING LINE USING THE CONVEYING APPARATUS

(75) Inventor: Günther Weber, Groß Nemerow (DE)

(73) Assignee: Weber Mashinenbau GmbH Breidenbach (DE)

( * ) Notice: Subject to any disclaimer, the term of this patent is extended or adjusted under 35 U.S.C. 154(b) by 931 days.

(21) Appl. No.: 13/211,710

(22) Filed: Aug. 17, 2011

(65) Prior Publication Data

US 2012/0042612 A1   Feb. 23, 2012

(30) Foreign Application Priority Data

Aug. 18, 2010   (DE) .......................... 10 2010 034 676

(51) Int. Cl.
| B65B 57/14 | (2006.01) |
|---|---|
| B65B 25/06 | (2006.01) |
| B65G 47/64 | (2006.01) |
| B65G 47/08 | (2006.01) |

(Continued)

(52) U.S. Cl.
CPC .............. B65G 47/084 (2013.01); B65B 35/54 (2013.01); B65B 35/44 (2013.01); B65G 47/642 (2013.01); B65B 25/065 (2013.01); B65B 57/14 (2013.01); B26D 7/32 (2013.01); B65B 25/06 (2013.01); B26D 2210/02 (2013.01)

(58) Field of Classification Search
CPC ...... B65B 25/06; B65B 25/065; B65B 35/24; B65B 35/44; B65B 35/54; B65B 57/10; B65B 57/14; B65B 63/00; B65B 65/006; B65G 47/084; B65G 47/642; B65G 47/71; B26D 7/32

USPC ............. 53/435, 448, 54, 494, 495, 513–519, 53/537, 543; 198/347.1, 347.4, 435, 198/457.03; 209/592; 426/518
See application file for complete search history.

(56) References Cited

U.S. PATENT DOCUMENTS 4,570,783 A  *  2/1986  Newcom et al. ........... 198/347.1
5,005,338 A  *  4/1991  Kemkers et al. ................ 53/494
(Continued)

FOREIGN PATENT DOCUMENTS

| DE | 3711688 A1 | * | 10/1988 | ............. B65B 25/06 |
| DE | 3733945 A1 | * | 4/1989 | ..................... 53/502 |

(Continued)

OTHER PUBLICATIONS

European Search Report for European Patent Application No. 11006548.9 dated Dec. 1, 2011, European Patent Office, 7 pgs. (with English translation).

*Primary Examiner* — Stephen F Gerrity
(74) *Attorney, Agent, or Firm* — Cantor Colburn LLP

(57) ABSTRACT

The invention relates to a method for conveying articles, in particular product slices produced by simultaneous slicing of a plurality of food products or respective portions including a plurality of product slices, wherein the articles are conveyed in a conveying direction on a main conveying path in multi-tracks in desired arrangements formed by articles from different tracks, in particular in rows extending transverse to the conveying direction, incomplete arrangements of articles having at least one deficient point are expelled onto a secondary conveying path and desired arrangements are formed from the articles forming the incomplete arrangements.

11 Claims, 1 Drawing Sheet

(51) Int. Cl.
   *B65B 35/54*   (2006.01)
   *B65B 35/44*   (2006.01)
   *B26D 7/32*    (2006.01)

(56) References Cited

U.S. PATENT DOCUMENTS

| | | | | |
|---|---|---|---|---|
| 5,209,339 | A | * | 5/1993 | Antonissen .................... 198/436 |
| 5,499,719 | A | * | 3/1996 | Lindee et al. ................. 198/435 |
| 5,749,205 | A | * | 5/1998 | Edwards et al. ................ 53/543 |
| 5,810,149 | A | * | 9/1998 | Sandberg et al. ............. 198/436 |
| 6,227,376 | B1 | * | 5/2001 | Handel et al. ................. 209/606 |
| 6,516,935 | B1 | * | 2/2003 | McLennan ................. 198/347.3 |
| 6,739,445 | B2 | * | 5/2004 | Armstrong .................... 198/435 |
| 6,763,748 | B2 | * | 7/2004 | Wolcott et al. ..................... 83/29 |
| 2004/0069156 | A1 | * | 4/2004 | Reed et al. .................... 99/450.1 |
| 2004/0159246 | A1 | * | 8/2004 | Weber ......................... 99/443 C |
| 2010/0101191 | A1 | | 4/2010 | Lindee |
| 2010/0107836 | A1 | * | 5/2010 | Lindee .............................. 83/23 |

FOREIGN PATENT DOCUMENTS

| | | | | |
|---|---|---|---|---|
| EP | 565019 | A1 * | 10/1993 | ...................... 53/494 |
| EP | 0 726 098 | B1 | 1/2002 | |
| GB | 1517511 | A * | 7/1978 | .............. B65G 47/71 |
| GB | 2276950 | A * | 10/1994 | ............... B26D 7/30 |
| JP | 04294704 | A * | 10/1992 | ........................ 53/54 |
| WO | WO 2008093364 | A1 * | 8/2008 | ............. B65B 25/06 |

* cited by examiner

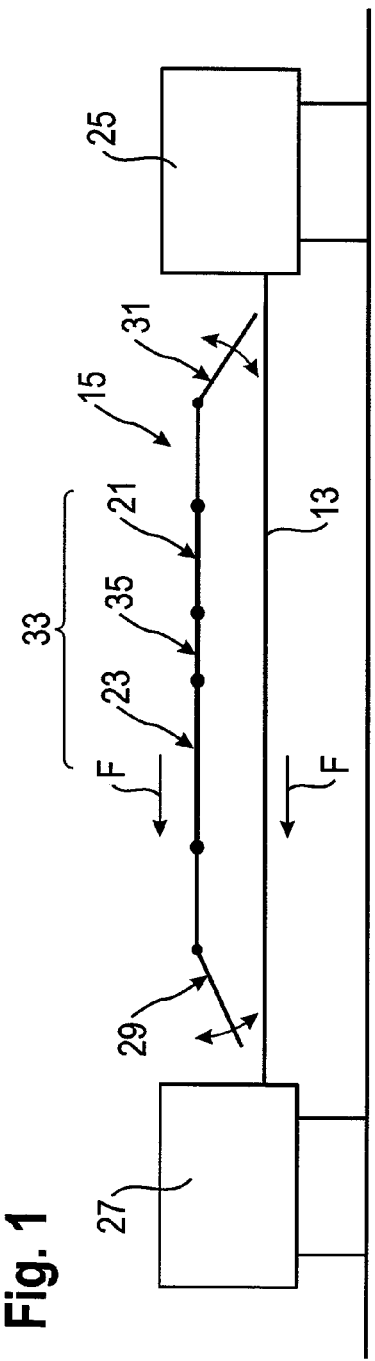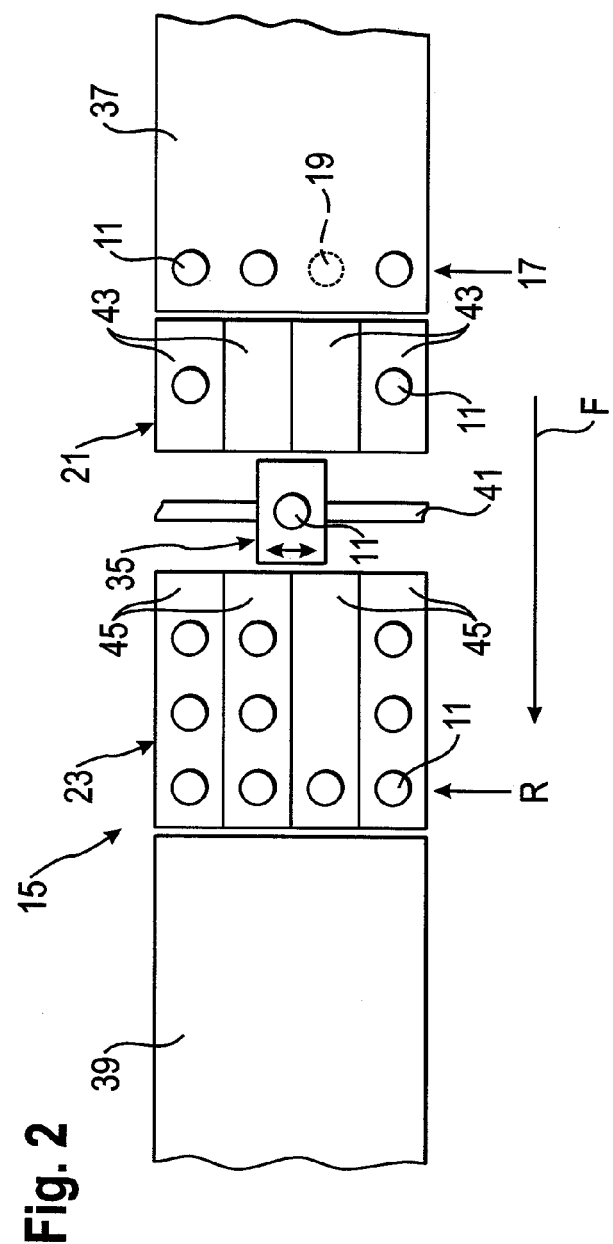

APPARATUS FOR CONVEYING OF ARTICLES AND PRODUCT SLICING AND PACKAGING LINE USING THE CONVEYING APPARATUS

CROSS-REFERENCE TO RELATED APPLICATION(S)

This application claims priority from German Patent Application No. DE 10 2010 034 676.4, filed Aug. 18, 2010, entitled "Conveying of Articles," which is fully incorporated herein by reference.

TECHNICAL FIELD

This disclosure relates generally to a method and to an apparatus for conveying articles and, more particularly, to product slices produced by simultaneous slicing of a plurality of food products or respective portions including a plurality of product slices.

SUMMARY OF THE INVENTION

If articles are to be conveyed in multitracks in predefined desired arrangements or format sets, problems can occur when deficient points arise—for whatever reason—that is incomplete arrangements of articles, and a device disposed downstream of the conveying device can either not work at all, or can only work while accepting disadvantages, with incomplete arrangements.

Such situations can in particular arise when the articles to be conveyed are product slices produced by simultaneous slicing of a plurality of food products or respective portions including a plurality of product slices.

The wanted or desired arrangement is, for example, a row of portions extending transversely to the conveying direction. Even if a product is sliced in all tracks and portions are formed from the product slices cut off in this process, deficient points can nevertheless arise if portions have to be sorted out due to errors. An error can, for example, be present when the portion has too low a weight, when the fat content of the slices forming the portion is too high or the appearance of the portion does not correspond to the desired criteria.

Deficient points in the desired arrangements, for example in the mentioned transverse rows, can also arise in that the simultaneously sliced products are of different lengths so that the slicing of a shorter product is ended earlier than the slicing of a longer product. No portions are then formed temporarily in the track of the shorter product, whereas the longer products in the other track or tracks are still being sliced so that a transporting away of the formed portions is necessary in these tracks.

The above-described causes for deficient points are only to be understood as examples. There can be a variety of reasons for deficient points in the desired arrangements.

It is known with respect to the conveying apparatus of downstream devices to compensate deficient points in desired arrangements such that the downstream device does not take over the articles directly from the conveying apparatus, but that rather a transfer device, for example one or more robots, is interposed which can remove the articles from the conveying apparatus and transfer them to the downstream device.

It can hereby be ensured, for example, that the operation of a packaging machine for portions formed from food slices are not impaired in that the portions are occasionally not led in by the conveying apparatus in the wanted desired arrangement. The robot can place the portions led in directly into the packaging machine or form a so-called format set on a placement system, said format set including one or more desired arrangements.

It is problematic in this procedure that the performance or capacity of the slicing apparatus for the food products has to be adapted or configured to the performance or capacity of the robot or robots. Modern high-speed slicers have such high cutting rates that a robot provided for the packaging machine would have to be equipped with kinematics which allow very fast movement procedures. Even if such kinematics can be technically realized, a correspondingly equipped robot frequently does not have the support capability required by practice, i.e. from a specific portion weight onward the portions can no longer be moved at the actually desired speed. In another example embodiment, a plurality of robots can, for example be provided in a sequential arrangement for the packaging machine, which, however, not only increases the costs, but also results in a relatively large construction length.

Another example embodiment may accept deficient points in the desired arrangements, which has the consequence, however, that empty packages are repeatedly produced in the packaging machine. This is not desirable against the background of the production costs increased by empty packages, particularly since not only packaging material is wasted, but also transport problems can occur on units disposed downstream of the packaging machine due to the empty packages.

It is an object of example embodiments to avoid impairments in an environment of the initially described kind caused by deficient points in desired arrangements in a manner that is as simple and as reliable as possible.

The method in accordance with example embodiments in particular satisfies this object in that the articles are conveyed in a conveying direction on a main conveying path in multitracks in desired arrangements formed by articles from a plurality of tracks. In particular, in rows extending transversely to the conveying direction, incomplete arrangements of articles having at least one deficient point are expelled onto a secondary conveying path and desired arrangements are formed from the articles forming the incomplete arrangements.

The apparatus in accordance with the invention in particular satisfies this object in that the apparatus includes: at least one main conveying path for the multitrack conveying of articles in a conveying direction in desired arrangements formed by articles from a plurality of tracks. In particular, rows extending transversely to the conveying direction include at least one secondary conveying path for incomplete arrangements of articles having at least one deficient point and at least one expulsion device for expelling incomplete arrangements onto the secondary conveying path and at least one formatting apparatus associated with the secondary conveying path. The formatting apparatus is designed to form desired arrangements from the articles forming the incomplete arrangements.

Example embodiments thus provide, in addition to a main conveying path for the articles located in the desired arrangement, a secondary conveying path on which desired arrangements can be formed during the conveying operation running on the main conveying path from the articles that form the incomplete arrangements. An advantage in this respect is that the formation of the desired arrangements does not have to take place on the secondary conveying path so fast that it corresponds to the "normal" conveying speed on the main conveying path. The forming of the desired arrangements on the secondary conveying path is to this extent therefore not a time-critical process. The devices required for the secondary conveying path therefore do not have to satisfy such high demands with respect to their working speed as would be the case for devices working on the main conveying path. The costs for the elimination of deficient points in accordance with the invention can hereby be considerably reduced.

Desired arrangements of articles which are to be conveyed to downstream devices such as packaging machines for portions of food slices, are also called format sets. In the terminology used here, a format set comprises one or more desired arrangements which are respectively formed by articles from a plurality of tracks in which the articles are conveyed. The formation of desired arrangements from the articles of incomplete arrangements on the secondary conveying path can to this extent also be called a format set formation. Seen in these terms, the invention therefore provides a format set formation from incomplete tracks.

Provision is accordingly made in an embodiment of the invention that format sets are formed on the main conveying path which each include at least one desired arrangement of articles. A format set is preferably a matrix of at least one row of articles arranged perpendicular to the conveying device.

Provision can furthermore be made in accordance with example embodiments that the articles on the secondary conveying path are removed from the incomplete arrangements sequentially, in particular individually, and the desired arrangements are each gradually formed from the removed articles. In this respect, the desired arrangements can consequently be built up piece by piece from individual articles which are each removed from the incomplete arrangements. It is, however, generally also possible to remove a plurality of articles simultaneously from the incomplete arrangements and to use them for the building up of the desired arrangements.

The removal of the articles, on the one hand, and the forming of the desired arrangements, on the other hand, preferably take place at regions spaced apart from one another along a conveying direction of the secondary conveying path.

The method in example embodiments preferably provides that the incomplete arrangements are stopped on the secondary conveying path. In this respect, the articles therefore rest before they are used for forming the desired arrangements.

Provision is made in a preferred embodiment that the desired arrangements formed on the secondary conveying path are again channeled into the main conveying path. This channeling can take place at generally any desired suitable time. It is in particular possible again to close gaps on the main conveying path which arose due to the expulsion of incomplete arrangements by desired arrangements formed on the secondary conveying path.

Example embodiments also relate to a method for producing and packaging respective portions including a plurality of product slices in which the portions are produced by simultaneous multitrack slicing of a plurality of food products by means of at least one slicing apparatus, in particular of a high-performance slicer, and portions located in a desired arrangement are packed by means of a packaging machine, with the portions being conveyed between the sliding apparatus and the packaging machine in accordance with a conveying process of the kind described here.

In the apparatus in accordance with example embodiments, the formatting apparatus is in particular designed to remove the articles from the incomplete arrangements sequentially, in particular individually, and to form the desired arrangements in each case gradually from the removed articles.

If the letters n and m each represent a track number, the formatting apparatus is preferably designed to remove an article from the track n and to transfer it to the track m in the formation of a desired arrangement, with both the case n=m and the case n≠m being able to be realized with the formatting apparatus. The formatting apparatus is in this respect therefore characterized by a high flexibility since the articles of the incomplete arrangements do not have to remain on the track on which they are located in the incomplete arrangement.

Provision can furthermore be made that the formatting apparatus is arranged between two regions spaced apart from one another along a conveying direction of which the one region is provided for removing the articles from the incomplete arrangements and the other region is provided for forming the desired arrangements.

The formatting apparatus preferably includes at least one transverse conveying unit movable transversely to a conveying direction of the secondary conveying path. In an embodiment, the transverse conveying unit is a belt conveyor whose conveying direction coincides at least in its region with the conveying direction of the secondary conveying path, with the belt conveyor itself being able to move transversely to this conveying direction. In this respect, in particular the effective width of the transverse conveying unit measured transverse to the conveying direction of the secondary conveying path is smaller than the width of the desired arrangement.

In an embodiment, the formatting apparatus includes, in addition to the transverse conveying unit, a stop conveyor for picking up and providing incomplete arrangements as well as a grouping conveyor for forming the desired arrangements, with the transverse conveying unit being designed to transfer articles from the stop conveyor to the grouping conveyor. The stop conveyor and/or the grouping conveyor is/are in particular a belt conveyor.

Alternatively or additionally, the formatting apparatus can include at least one robot that is designed to pick up articles at one position and to place them down at another position. The robot can consequently gradually build up desired arrangements from the articles of incoming incomplete arrangements, with in this respect the robot not having to have complex kinematics with respect to the working speed since—as already mentioned—the formation of the desired arrangements on the secondary conveying path may not be a process critical in time.

The conveying apparatus furthermore preferably includes at least one channeling device for channeling desired arrangements formed on the secondary path into the main conveying path.

Example embodiments moreover relate to a production line having at least one slicing apparatus, in particular a high-performance slicer, for the simultaneous multitrack slicing of a plurality of food products into respective portions including a plurality of product slices, having at least one conveying apparatus of the kind described here as well as having at least one packaging machine for packaging portions located in a desired arrangement.

Further possible embodiments of the invention are also set forth in the dependent claims, in the description and in the drawings.

BRIEF DESCRIPTION OF THE DRAWINGS

The invention will be described in the following by way of example with reference to the drawings. There are shown:

FIG. 1 schematically, a side view of a production line in accordance with an example embodiment with a conveying apparatus in accordance with at least one example embodiment; and FIG. 2 schematically, a plan view of an embodiment of a conveying apparatus in accordance with an example embodiment.

REFERENCE NUMERAL LIST 11 article, portion
13 main conveying path
15 secondary conveying path
17 incomplete arrangement
19 deficient point
21 stop conveyor
23 grouping conveyor
25 slicing apparatus, slicer
27 packaging machine
29 channeling-in device, outlet rocker
31 expulsion device, inlet rocker
33 formatting unit
35 formatting apparatus, transverse conveying unit
37 conveyor
39 conveyor
41 transverse guide
43 track conveyor
45 track conveyor
F conveying direction
R desired arrangement, row

DETAILED DESCRIPTION

The production line in accordance with the invention in accordance with FIG. 1 includes a slicer 25 that is designed to simultaneously cut food products supplied in multiple tracks into slices. Such apparatus are generally known. There can be differences, for example, in the design and movement procedure of the cutting blade used for slicing and in the design of the product feed. Further, the slicer 25 may be a high speed slicer.

Portions are formed from the slices cut from the products in the individual tracks, with the portions arising simultaneously in the tracks when a product is sliced in every track. The apportioned slicing as well as means for portion formation and, optionally, for-so-called portion completion are known in a variety of designs.

In accordance with the terminology used here, a desired arrangement of portions is present when a portion is present in each track and these portions form a row extending transversely to a conveying direction F. A format set comprises one or more desired arrangements of this kind.

The desired arrangements or format sets are supplied on a main conveying path 13 only shown schematically in FIG. 1 in a conveying direction F to a packaging machine 27 which is designed to receive the portions in a specific desired arrangement or in a specific format set, i.e. in an arrangement which does not have any deficient points.

For reasons such as were mentioned in the introduction part, deficient points can usually not be avoided in practice and thus incomplete arrangements of portions arise. So that no incomplete arrangements are transferred to the packaging machine 27, a secondary conveying path 15 that extends above or vertically aligned with the main conveying path 13 in the embodiment shown in FIG. 1 is provided in accordance with an example embodiment in addition to the main conveying path 13.

The incomplete arrangements can move onto the secondary conveying path 15 by means of a so-called inlet rocker 31 which can, for example, be a pivotable belt conveyor such as is indicated by the double arrow in FIG. 1. The inlet rocker 31 forms a device for expelling incomplete arrangements onto the secondary conveying path 15.

The conveying apparatus in accordance with an example embodiment between the slicer 25 and the packaging machine 27 and including the main conveying path 13 and the secondary conveying path 15 is connected to a control unit, not shown, which is formed to detect deficient points and thus incomplete arrangements. The control unit is configured to control the inlet rocker 31 so that incomplete arrangements can move onto the secondary conveying path 15.

The secondary conveying path 15 includes a formatting unit 33 that includes, in the example embodiment show here, a stop conveyor 21, a formatting apparatus 35 having a transverse conveying unit and a grouping conveyor 23. These devices are in each case a belt conveyor, in particular a continuous belt conveyor. A possible embodiment for the formatting unit 33 is described in more detail in the following in connection with FIG. 2.

FIG. 2 represents schematically a plan view of an embodiment of a conveying apparatus. In FIG. 2, both the stop conveyor 21 and the grouping conveyor 23 may be a combination of track conveyors 43 and 45 respectively that are arranged next to one another—seen in the conveying direction F—and can be operated independently of one another. Each track conveyor 43 and 45 respectively is associated with a track of the production line. The production line includes four tracks in the embodiment shown here.

As FIG. 2 further shows, incomplete arrangements 17, that is arrangements having at least one deficient point 19, move on the secondary conveying path 15 from a conveyer 37 onto the individual track conveyors 43 of the stop conveyor 21. The stop conveyor 21 takes over the present portions 11 of the incomplete arrangement 17 and stops so that the incomplete arrangements comes to rest on the stop conveyor 21. The next incomplete arrangement is only picked up by the stop conveyor 21 when all portions 11 of the picked-up incomplete arrangement have been removed from the stop conveyor 21.

This removal of portions 11 takes place by means of the transverse convening unit 35 whose continuous conveyor belt is movable transverse to the conveying direction F along a transverse guide 41, as is indicated by the double arrow. In the embodiment shown, the belt conveyor of the transverse conveying unit 35 is provided with an effective width which approximately corresponds to the width of a track, i.e. viewed in a direction transverse to the conveying direction F, the transverse conveying unit 35 shown here can pick up a portion.

A removed portion 11 is supplied to one of the track conveyors 45 of the grouping conveyor 23 in dependence on the situation on the grouping conveyor 23. The mentioned control unit provides the association.

In this manner, desired arrangements R can gradually be built up on the grouping conveyor 23 from the portions 11 of the incomplete arrangements 17. Such a desired arrangement R is already present on the grouping conveyor 23 in the embodiment of FIG. 2. This desired arrangement R can consequently be transferred to the downstream conveyor 39 by simultaneous operation of all track conveyors 45 of the grouping conveyer 23.

It is, however, also possible to occupy the points instantaneously still free on the grouping conveyor 23 with a portion 11 in each case since the track conveyors 45 of the grouping conveyor 23 can also be operated against the conveying direction F, i.e. the track conveyor 45 having the two free points in FIG. 2 can be operated against the conveying direction F to provide a front free point for taking over the portion 11 transported in by the transverse conveying unit 35, whereupon the track conveyor 45 is operated in the conveying direction F to pick up the next portion 11 delivered by means of the transverse conveying unit 35.

A complete 3×4 matrix hereby arises from the desired arrangements R on the grouping conveyor 23. This matrix can form a format set such as is required for the packaging machine 27 (cf. FIG. 1).

The individual desired arrangements R or the format sets which comprise one or more such desired arrangements R and which are formed in accordance with the invention on the secondary conveying path 15 from the portions of the incomplete arrangements 17 can again be channeled into the main conveying path 13 (cf. FIG. 1). An output rocker 29 that is provided at the end of the secondary conveying path 15 and is likewise connected to the above-mentioned control unit serves for this purpose.

Example embodiments are generally not restricted to the conveying of portions from food slices. Any desired articles can generally be conveyed. The downstream device furthermore does not have to be a packaging machine.

Example embodiments can generally be used in applications in which desired arrangements are expected at the output side, but in which—for whatever reason—incomplete arrangements can arise at the input side.

What is claimed is:

1. An apparatus for conveying articles, comprising:
   at least one main conveying path configured to multitrack convey the articles in a first direction forming desired arrangements including the articles from a plurality of tracks;
   at least one secondary conveying path for incomplete arrangements of articles having at least one imperfection;
   at least one expulsion device configured to expel the incomplete arrangements onto the secondary conveying path; and
   at least one formatting apparatus which is associated with the secondary conveying path and which is designed to form desired arrangements from the articles forming the incomplete arrangements, wherein the formatting apparatus is designed to remove an article from a first track and, on the formation of the desired arrangement, to transfer it to a second track, wherein the formatting apparatus is configured to determine if at least one of the first track equals a criteria of the second track and the first track does not equal the criteria of the second track.

2. An apparatus in accordance with claim 1, wherein the formatting apparatus is designed to remove the articles from the incomplete arrangements sequentially and to form the desired arrangements in each case gradually from the removed articles.

3. An apparatus in accordance with claim 1, wherein the formatting apparatus is operatively between two regions that are spaced apart from one another along a second direction of conveying of the secondary conveying path and one of the two regions being provided for removing the articles from the incomplete arrangements and a second of the two regions being provided for forming the desired arrangements.

4. An apparatus in accordance with claim 1, wherein the formatting apparatus is designed to pick up articles at one position and to place the articles down at a different position.

5. An apparatus in accordance with claim 4, wherein the formatting apparatus is designed to pick up individual articles.

6. An apparatus in accordance with claim 1, wherein at least one channeling-in device is provided for channeling the desired arrangements formed on the secondary conveying path into the main conveying path.

7. An apparatus for conveying articles, comprising:
   at least one main conveying path configured to multitrack convey the articles in a first direction forming desired arrangements including the articles from a plurality of tracks;
   at least one secondary conveying path for incomplete arrangements of articles having at least one imperfection;
   at least one expulsion device configured to expel the incomplete arrangements onto the secondary conveying path; and
   at least one formatting apparatus which is associated with the secondary conveying path and which is designed to form desired arrangements from the articles forming the incomplete arrangements, wherein the formatting apparatus includes at least one transverse conveying unit movable transverse to the second direction of conveying of the secondary conveying path, and/or wherein the effective width of the transverse conveying unit measured transversely to the second direction of conveying of the secondary conveying unit is smaller than the width of the desired arrangement.

8. An apparatus in accordance with claim 7, wherein the formatting apparatus additionally includes a stop conveyor configured to pickup and convey incomplete arrangements and a grouping conveyor configured to form the desired arrangements, with the transverse conveying unit being designed to transfer articles from the stop conveyor to the grouping conveyor.

9. An apparatus in accordance with claim 8, wherein the stop conveyor is formed as a belt conveyor, and/or wherein the grouping conveyor is formed as a belt conveyor.

10. A product line comprising:
    at least one slicing apparatus for the simultaneous multitrack slicing of a plurality of food products into respective portions including a plurality of product slices;
    at least one conveying apparatus comprising;
    at least one main conveying path configured to multitrack convey the articles in a first direction forming desired arrangements including the articles from a plurality of tracks;
    at least one secondary conveying path for incomplete arrangements of the articles having at least one imperfection;
    at least one expulsion device configured to expel the incomplete arrangements onto the secondary conveying path; and
    at least one formatting apparatus which is associated with the secondary conveying path and which is designed to form desired arrangements from the articles forming the incomplete arrangements, the formatting apparatus being designed to remove an article from a first track and, on the formation of the desired arrangement, to transfer it to a second track, wherein the formatting apparatus is configured to determine if at least one of the first track equals a criteria of the second track and the first track does not equal the criteria of the second track; and
    at least one packaging machine configured to pack the desired arrangements.

11. A product line comprising:
    at least one slicing apparatus for the simultaneous multitrack slicing of a plurality of food products into respective portions including a plurality of product slices;
    at least one conveying apparatus comprising;

at least one main conveying path configured to multitrack convey the articles in a first direction forming desired arrangements including the articles from a plurality of tracks;

at least one secondary conveying path for incomplete arrangements of the articles having at least one imperfection;

at least one expulsion device configured to expel the incomplete arrangements onto the secondary conveying path; and at least one formatting apparatus which is associated with the secondary conveying path and which is designed to form desired arrangements from the articles forming the incomplete arrangements, the formatting apparatus including at least one transverse conveying unit movable transverse to the second direction of conveying of the secondary conveying path, and/or wherein the effective width of the transverse conveying unit measured transversely to the second direction of conveying of the secondary conveying unit is smaller than the width of the desired arrangement; and at least one packaging machine configured to pack the desired arrangements.

\* \* \* \* \*